United States Patent
Cwik et al.

(10) Patent No.: US 9,926,903 B2
(45) Date of Patent: Mar. 27, 2018

(54) METHOD AND CONTROL UNIT FOR DETERMINING A FUTURE ROTATIONAL SPEED

(75) Inventors: Matthias Cwik, Stuttgart (DE); Markus Roessle, Stuttgart (DE); Ewald Mauritz, Weissach (DE); Stefan Tumback, Stuttgart (DE)

(73) Assignee: SEG Automotive Germany GmbH, Stuttgart (DE)

( * ) Notice: Subject to any disclaimer, the term of this patent is extended or adjusted under 35 U.S.C. 154(b) by 1328 days.

(21) Appl. No.: 13/574,851

(22) PCT Filed: Dec. 30, 2010

(86) PCT No.: PCT/EP2010/070903
§ 371 (c)(1),
(2), (4) Date: Nov. 9, 2012

(87) PCT Pub. No.: WO2011/091942
PCT Pub. Date: Aug. 4, 2011

(65) Prior Publication Data
US 2013/0054185 A1 Feb. 28, 2013

(30) Foreign Application Priority Data
Jan. 27, 2010 (DE) .......... 10 2010 001 257

(51) Int. Cl.
*F02N 11/08* (2006.01)

(52) U.S. Cl.
CPC ...... *F02N 11/0855* (2013.01); *F02N 11/0844* (2013.01); *F02N 2200/021* (2013.01); *F02N 2200/022* (2013.01); *Y02T 10/48* (2013.01)

(58) Field of Classification Search
CPC ............ F02N 11/0844; F02N 11/0855; F02N 2300/2006; F02N 2300/2008;
(Continued)

(56) References Cited

U.S. PATENT DOCUMENTS 5,796,677 A * 8/1998 Kostek .............. G01V 1/48
175/50
6,873,930 B2 * 3/2005 Hirn .............. F02D 41/0097
702/142

(Continued)

FOREIGN PATENT DOCUMENTS

DE    10 2006 011 644    9/2007
DE    10 2008 041 037    2/2010
(Continued)

*Primary Examiner* — Hyun Park
*Assistant Examiner* — Liam R Casey
(74) *Attorney, Agent, or Firm* — Norton Rose Fulbright US LLP; Gerard A. Messina (57) ABSTRACT

A method for determining a future rotational speed of a rotating drive shaft of an internal combustion engine is described, in particular while the internal combustion engine coasts after being turned off, the future rotational speed being calculated from a course of measured rotational speeds. To predict a future rotational speed of the drive shaft of the internal combustion engine as accurately as possible, instantaneous rotational speeds measured at different rotational positions of drive shaft are evaluated.

23 Claims, 4 Drawing Sheets

(58) Field of Classification Search
CPC ........... F02N 2300/20; F02N 2300/102; F02N 11/08; F02N 11/0803; F02N 11/0814; F02N 11/0851; F02N 2200/021; F02N 2200/022
See application file for complete search history.

(56) References Cited

U.S. PATENT DOCUMENTS

| | | | |
|---|---|---|---|
| 2004/0135992 A1* | 7/2004 | Munro | G01S 7/483 356/4.01 |
| 2007/0255148 A1* | 11/2007 | Bhunia | A61B 5/02028 600/509 |
| 2007/0258074 A1* | 11/2007 | Moest | G03F 9/7011 355/55 |
| 2008/0184703 A1* | 8/2008 | Gerth | F16H 61/425 60/426 |
| 2011/0118962 A1* | 5/2011 | Couetoux | F02N 11/0844 701/113 |

FOREIGN PATENT DOCUMENTS

| | | |
|---|---|---|
| WO | 2008/080679 | 7/2008 |
| WO | 2009/083477 | 7/2009 |

* cited by examiner

METHOD AND CONTROL UNIT FOR DETERMINING A FUTURE ROTATIONAL SPEED

RELATED APPLICATION INFORMATION

The present application claims priority to and the benefit of PCT/EP2010/070903, which was filed on the Dec. 30, 2010, the disclosure of which is incorporated herein by reference.

FIELD OF THE INVENTION

The present invention relates to a method for determining a future rotational speed of a rotating drive shaft of an internal combustion engine, in particular while the internal combustion engine coasts after being turned off, the future rotational speed being calculated from a course of measured rotational speeds. Furthermore, the present invention relates to a control unit, in particular for a start-stop system of a motor vehicle, having an evaluation device, in particular having a microcomputer, for calculating a future rotational speed from a course of the measured rotational speeds of a drive shaft of an internal combustion engine. The present invention also relates to a computer program product.

BACKGROUND INFORMATION

For starting, a starting device for the internal combustion engine having a starter motor is usually coupled to the internal combustion engine in that a starter pinion of the starter motor meshes with a ring gear of the internal combustion engine. For this purpose, the ring gear is situated on a drive shaft of the internal combustion engine.

A start-stop system for a motor vehicle having an internal combustion engine is known to turn off the internal combustion engine at a brief stop of the motor vehicle, e.g., at a red traffic light, and to restart it to continue driving.

Moreover, it is understood to turn off the internal combustion engine by discontinuing the fuel supply, e.g., an injection, and/or an ignition of the fuel; in this case, the internal combustion engine does not stop immediately after being turned off, but coasts in a characteristic manner, namely in a characteristic rotational speed course of the drive shaft which is referred to in the following as coasting. The internal combustion engine has cylinders which each determine the characteristic rotational speed course.

International patent application WO 2009/083477 A1 discusses a method for activating a control unit of a starter of an internal combustion engine to reengage a coasting internal combustion engine for a reflex start. A general slope trend of the coasting rotational speed is calculated from multiple speed points over several cycles.

German patent document DE 10 2008 041 037 discusses a method of a control for a start-stop operation of an internal combustion engine in a motor vehicle for temporarily stopping and starting the internal combustion engine which is started by an electric machine as a starter; for this purpose, the position and the rotational speed of a crankshaft are detected by a detection device during operation and after turning off the internal combustion engine, in particular for a temporary stop. Furthermore, the course of the rotational speed of the crankshaft is calculated in advance at and from characteristic repeating positions, such as dead centers, of the crankshaft actively and anew after turning off the internal combustion engine.

SUMMARY OF THE INVENTION

It is an object of the exemplary embodiments and/or exemplary methods of the present invention to refine a method, a control unit, and a computer program product of the type mentioned at the outset in such a way that a future rotational speed of a rotating drive shaft of an internal combustion engine is predictable as accurately as possible, in particular when the internal combustion engine is turned off, i.e., coasts due to a stopped injection, for example.

According to the exemplary embodiments and/or exemplary methods of the present invention, the object is achieved by the subject matter described herein. Advantageous refinements result from the further description herein.

An idea aspect of the exemplary embodiments and/or exemplary methods of the present invention is that instantaneous rotational speeds measured at different rotational positions of the drive shaft are evaluated.

Another aspect of the exemplary embodiments and/or exemplary methods of the present invention is that an evaluation device for evaluating the instantaneous rotational speeds measured at different rotational positions of the drive shaft is implemented in a control unit which, in particular, carries out a method described previously or in the following.

Course $n_v$ represents the measured rotational speeds as measured values, i.e., an actual rotation of the drive shaft, in particular coasting $n_A$ in the coasting internal combustion engine; as rotational speed data, the course includes the measured rotational speeds paired with the associated rotational position data and/or time information.

The following description refers to the coasting as a special case of the rotational speed course and also applies to a rotational speed course of a non-coasting internal combustion engine.

Due to the fact that in particular two, which may be all available, measured rotational speeds are evaluated, a triplet, the value of the rotational speed at a particular rotational position and a chronological development, are detected, thus making a prediction of the future rotational speed possible. In this way, the future rotational speed may be predicted from the measured course, and the course of the previously measured rotational speeds may be adjusted until a later point in time, in particular according to a characteristic shape of the course.

Moreover, the measured rotational speeds are each instantaneous rotational speeds of the drive shaft at the particular rotational position, i.e., in particular no mean rotational speeds which were, for example, derived from a time period for a periodic overwriting of a certain rotational position. At least two, in particular as many as possible, rotational speeds may be evaluated together with their respective rotational positions within one rotation period of the drive shaft. In this way, the movement of the drive shaft, in particular also during one individual rotation, may be detected more accurately with the aid of the course, and the future rotational speed for any later point in time, in particular regardless of a predefined rotational position, may be predicted more accurately.

Moreover, the factors determining the coasting of the internal combustion engine, in particular the instantaneous engine parameters and instantaneous surrounding conditions, may be considered in a simple and exact manner based on the characteristic shape of the course, i.e., a very high accuracy may be achieved when predicting the future rotational speed according to this method.

Moreover, friction and load torques varying in the short-term and in the long-term at the internal combustion engine, for example, due to electrical consumers or an air conditioner, an intake manifold pressure varying in the short-term and in the long-term, which, for example, depends on a throttle valve position, an air pressure, or an operational altitude above sea level of the internal combustion engine, and/or a varying leakage in the compression cycle, resulting, for example, from an aging of the internal combustion engine, may be taken into consideration, so that engine- and surrounding-specific influences, which affect the characteristic shape of the course, e.g., a slope and/or amplitude of an oscillation, are taken into consideration, and the future rotational speed is thus determinable more accurately.

A mean rotation of the drive shaft may thus be superimposed by an oscillation so that the course also has an oscillation which is, for example, caused by oscillations or based on compression and decompression cycles due to a piston movement, in particular dependent on the engine type and/or characteristic for the internal combustion engine. This oscillation may essentially be determined by an energy conversion from kinetic energy into potential energy, namely compression energy, and vice versa.

The future rotational speed may be determined while the internal combustion engine coasts after being turned off. In particular in a start-stop system in which after turning off the internal combustion engine the starter motor is to be coupled already to the coasting, i.e., still rotating, internal combustion engine to make a delay-free restart possible, for example, an accurate prediction of the future rotational speed is advantageous in order to mesh a starter pinion, which is also rotating, with a ring gear, which may be synchronously with regard to a rotational speed as well as with what may be little wear or free from wear. Moreover, a future point in time at which the internal combustion engine will come to a standstill may be accurately determined.

As many rotational speeds as possible, which may be having as high a chronological density as possible, in particular to all available or selected points of event, may be measured for each coasting $n_A$ of the internal combustion engine and processed using the microcomputer. The drive shaft includes a sensor wheel having teeth which are detected with the aid of a sensor. The position and the rotational speed are evaluated therefrom with regard to time. In this way, it is possible to establish an accurate prognosis, i.e., to reliably adjust course $n_z$ into the future, in particular for the later point in time, based on course $n_v$ of the measured rotational speeds.

Advantageously, a plurality of rotational speeds is measured, in particular at different, which may be arbitrary, rotational positions, namely increasingly in this order, which may be at least three, five, seven, or ten rotational speeds at different rotational positions, each within one periodic movement of the drive shaft, which may be within one period of the previously mentioned oscillation, so that the rotation of the drive shaft may be determined more accurately, i.e., the future rotational speed is derivable more accurately. Moreover, the accuracy of the future rotational speed is also increased in that a deviation or a tolerance of an individual measured rotational speed improves the quality of the prognosis when an increasingly larger number of rotational speeds of course $n_v$ is measured. Thus, the future rotational speed may be determined more accurately for any future points in time, rotational speeds, or rotational positions.

A regression line $n_m$ having a slope may be determined from the course, and the future rotational speed is derived from at least one linear portion having the slope. A change over time of the coasting may be described in a particularly simple manner, in particular with little calculating effort. It is also possible to adjust with little calculating effort the course of the measured rotational speeds to the later point in time using the linear portion having that same slope in order to determine the future rotational speed. The linear portion thus identifies a component for determining the future rotational speed. In particular in the case of a rotation of the drive shaft having a small oscillation about a mean rotational speed change, the future rotational speed may be advantageously determined already from the linear portion, namely with little calculating effort and with high accuracy.

Moreover, in a course which has no or only an unessential oscillation, the future rotational speed may be determined chronologically even before a periodic movement of the drive shaft has taken place, in particular before a period of the oscillation has taken place, so that an early and rapid prognosis, in particular updated using every additional measured rotational speed, is available. In this way, the future coasting of the internal combustion engine may be determined after a short period of time, i.e., also after or from few measured rotational speeds.

The regression line having the slope may be accurately determined with little calculating effort, namely in particular by the microcomputer, from the measured rotational speeds, in particular, using an averaging method, which may be using a method of linear regression. Averaging compensates for tolerances and deviations of individual measured rotational speeds at least partially so that the future rotational speed is determinable more accurately. Moreover, other known averaging methods may also be used.

This means that a mean slope of the rotational speed, in particular for a certain time segment of the course, may be attributed to the coasting of the internal combustion engine by a mean regression line. The mean slope considers the instantaneously occurring friction and load torques at the internal combustion engine so that they are advantageously incorporated into the future rotational speed with the aid of the mentioned evaluation.

Furthermore, the accuracy when determining the future rotational speed from rotational speeds, measured not equidistantly over time, of the course may be increased by weighting the individual measured rotational speeds of the course with regard to a suitable density function for the averaging. In this way, it is possible to determine the slope more accurately, in particular for any chronologically measured rotational speeds, by providing measured rotational speeds having a low density over time, i.e., having larger time intervals between any two measurements, with a higher weighting factor.

The future rotational speed may be derived from the linear portion having a base point for the linear portion which is a point of the regression line corresponding to a point in time of a most recently measured rotational speed which is taken into consideration when determining the future rotational speed. Thus, to accurately determine the future rotational speed, the course may be adjusted into the future from the base point to achieve a short prognosis duration, namely from the point in time of this most recent rotational speed until the later point in time of the future rotational speed.

The future rotational speed may be determined increasingly more accurately by repeatedly carrying out the steps described previously and in the following so that the future rotational speed is determinable increasingly more accurately due to a plurality of prognoses of the future rotational speed and/or an increasing reduction of the prognosis duration through other measured rotational speeds which are chronologically closer to the later point in time. The prognosis steps and/or the future rotational speed may be based on fixed angular steps of the rotation of the drive shaft, on fixed time steps, or also on other steps or increments.

Moreover, the accuracy when determining the future rotational speed may be increased through smoothing by determining at least one additional slope from different subsets of the measured rotational speeds for a plurality of measured rotational speeds. An instantaneous slope may be determined in each case during the coasting of the internal combustion engine, which may be in the presence of an additional, most recently measured rotational speed. Furthermore, an averaged slope of the course may be determined in this way from the previously determined slopes, namely using a triple-slip mean value which is updated, in particular, for each additionally available, in particular most recently measured, rotational speed. Here, the most recently measured rotational speed may be evaluated immediately to determine the slope. As will be explained below, a suitable subset of (other) measured rotational speeds, from which the slope is derived, for example, by determining a segment of the course essentially having a length of exactly one period duration of the oscillation, may be determined using the most recently measured rotational speed.

In a course without or having only a small oscillation, the averaging may be extended over all measured rotational speeds to increase the accuracy of the slope, i.e., also of the prognosis of the future rotational speed, by increasingly compensating for a deviation or a tolerance of an individual measured rotational speed by an increasing number of all the considered measured rotational speeds.

As mentioned above, the course may have an oscillation. Here, the future rotational speed may be derived from rotational speeds which were measured essentially within a certain phase range of the oscillation. Thus, it is possible to reduce an influence of the oscillation, for example, by taking into consideration only the rotational speeds from one phase range of the oscillation which are close to a center line of the course or close to the regression line. The center line refers to a curve, which corresponds to the oscillation-adjusted course. The rotational speeds may be evaluated from a phase range having a positive or a negative amplitude of the oscillation, or from a phase range having a positive and, adjoining on each side, a negative amplitude, or having a negative and, adjoining on each side, a positive amplitude. In this way, a symmetry of the oscillation may be taken into consideration.

In particular, if the measured rotational speeds are scattered not accidentally, but symmetrically, around the center line, measured rotational speeds from a selected suitable phase range and not all available rotational speeds may be used to determine the slope. For this purpose, the phase range may be selected in such a way that it equally considers the measured rotational speeds both above and below the center line to accurately describe the slope for the linear portion with regard to the center line and to increase the accuracy for the prognosis of the future rotational speed, namely having little distortion through the oscillation.

It particularly may be that the future rotational speed is derived from rotational speeds which together span a time segment of the course, this segment essentially corresponding to a multiple of a, in particular of exactly one, complete period duration of the oscillation. Thus, the influence of the oscillation may be easily reduced since a period, i.e., also two or more periods, equally includes measured rotational speeds above and below the center line so that the particular deviations of the rotational speeds from the center line are compensated for at least partially.

The period starts at a rotational position at which the instantaneous rotational speed has an extreme, e.g., a maximum or a minimum, in relation to the center line, and extends until a rotational position at which the rotational speed has a subsequent identical extreme, e.g., a maximum or a minimum. In this way, an accurate adjustment of the regression line to the center line, i.e., an accurate determination of the slope, may be achieved for an oscillation, in particular using a method of the linear regression.

According to another method that older rotational speeds may be disregarded when determining the future rotational speed, in particular in that the oldest considered rotational speed is maximally older by a certain period than a most recent considered rotational speed. In this way, the future rotational speed may be determined more accurately for a chronologically curved course by evaluating a more recent, i.e., instantaneous, segment of the course. In this way, both a curvature of the course from flat to steeper, e.g., due to a delayed reduction over time of the injection quantity when turning off the engine, or from steeper to flatter, e.g., due to viscous friction, may be taken into consideration.

Moreover, the slope of the curved course is determinable more accurately, in particular section by section, by taking into consideration, i.e., by determining a local slope of the curved course, a selected characteristic course of the rotational speed, i.e., a time segment having the length of the certain duration. In this case, the certain duration may be selected to be as short as possible, namely in particular to have a certain number of periodic durations of the oscillation, so that the slope and the linear portion derived therefrom describe the curved course, section by section and as accurately as possible. Moreover, the certain duration may correspond to at the most three, two, or one of such period duration(s) increasingly in this order.

The most recent rotational speed considered when determining the future rotational speed may be more recent than a period duration of an oscillation of the course. The most recent considered rotational speed is thus spaced apart chronologically from a most recently measured rotational speed by less than one period duration so that only more recently measured rotational speeds, in particular from a most recent period of the oscillation detected completely by measured values, are taken into consideration, which may be as base points, for an instantaneous and accurate determination of the future rotational speed.

The future rotational speed may be derived from at least one oscillating portion. As previously mentioned, the course may have an oscillation which is then considered by using the oscillating portion when determining the future rotational speed in order to increase its accuracy. The oscillating portion thus identifies a component for determining the future rotational speed, the course may be adjusted into the future using a superposition of the linear and the oscillating portions.

The oscillating portion may be derived from an oscillation characteristics curve which is, for example, stored in a memory for the microcomputer. In this way, an oscillation of the rotation of the drive shaft characteristic for the particular internal combustion engine may be considered with little calculating effort.

Here, the oscillation characteristics curve may be an, in particular standardized, energy transformation characteristics curve which is specific for the internal combustion engine and which is made available as a reference table. The energy transformation characteristics curve specifies as a function of a rotational position of the drive shaft, i.e., as a function of a crankshaft angle, for example, what portion of a maximum potential energy is currently converted at the drive shaft into kinetic energy. The energy transformation characteristics curve thus characterizes an energy conversion from potential energy into kinetic energy and vice versa, which takes place cyclically. The minima of the energy transformation characteristics curve are usually at positions corresponding to the ignition top dead centers of the internal combustion engine, since the energy stored in the compression is at its maximum and the kinetic energy is at its minimum.

The oscillating portion may be derived from a rotational speed-dependent amplitude characteristics curve. It may thus be taken into consideration that a maximum amplitude of the oscillation of the course is dependent on the rotational speed so that the future rotational speed may be calculated in advance not only for a few designated points but for any time, angle or rotational-speed steps, namely in particular even in the case of rapidly decreasing rotational speeds of the drive shaft. Moreover, the amplitude characteristics curve may be configured specifically for the particular internal combustion engine and stored as a standard amplitude characteristics curve in a memory for a microcomputer, as a reference table, for example.

The oscillation intensity, i.e., the maximum amplitude, may depend during the coasting on an instantaneous intake manifold pressure, namely on a closing degree of the throttle valve; in some designs of the internal combustion engine, the oscillation is only small, in particular also negligible, while it is strong in other designs. The influences are then taken into consideration by the oscillating portion when determining the future rotational speed in order to increase the accuracy of the prognosis.

The oscillating portion may be derived from the standard amplitude characteristics curve with the aid of a, which may be established and/or simple, calculation specification, the oscillation of the course of the measured rotational speeds being, in particular, detected and an amplitude correction stage being derived therefrom. As previously mentioned, the standard amplitude characteristics curve provides a piece of information regarding the maximum amplitude of the oscillation of the course, namely as a function of a rotational speed of the internal combustion engine. To describe the course more accurately and to adjust it with a higher accuracy, as described previously and in the following, for the determination of the future rotational speed, the influences, which have an effect on the maximum amplitude, may be taken into consideration with the aid of selected amplitude correction stages in that the oscillating portion is derived from the standard amplitude characteristics curve using the established simple calculation specification corresponding to the amplitude correction stage. The amplitude correction stage makes possible a simple and resource-conserving calculation of the oscillating portion from the standard amplitude characteristics curve with the aid of the calculation specification assigned to the amplitude correction stage.

In order to determine the amplitude correction stage exactly and as simply as possible, namely in particular without a complex modeling of the influences, an actual maximum amplitude of the oscillation of the course of the measured rotational speeds may be determined, and the instantaneous actual amplitude correction stage may be derived therefrom, in particular by a simple comparison. Thus, only one single standard amplitude characteristics curve must be available to adjust the oscillating portion as a function of instantaneous influences and of the rotational speed with the aid of the calculation specification.

The object is also achieved by a computer program product which is loadable into a program memory having program instructions of a microcomputer to execute all steps of a method described previously or in the following, in particular when the computer program product is executed in the control unit. In this case, the microcomputer may be an integral part of the control unit; the control unit, in particular in a plurality of control devices of the system, may also have a plurality of microcomputers and also memories as well as a plurality of computer program products, or also an implemented computer program product which is distributed over a plurality of control devices. The computer program product requires only a few or no additional components in the control unit and may be implemented as a module in an already existing control unit. The computer program product has the additional advantage that it is easily adjustable to individual and specific customer requests and that improvements or optimizations of individual method steps are possible at low cost and with little effort.

It is understood that the aforementioned features and the features still to be explained below may be used not only in the particular combination specified but also in other combinations.

The exemplary embodiments and/or exemplary methods of the present invention are explained in greater detail below with reference to the drawings.

DETAILED DESCRIPTION

Figure 1:
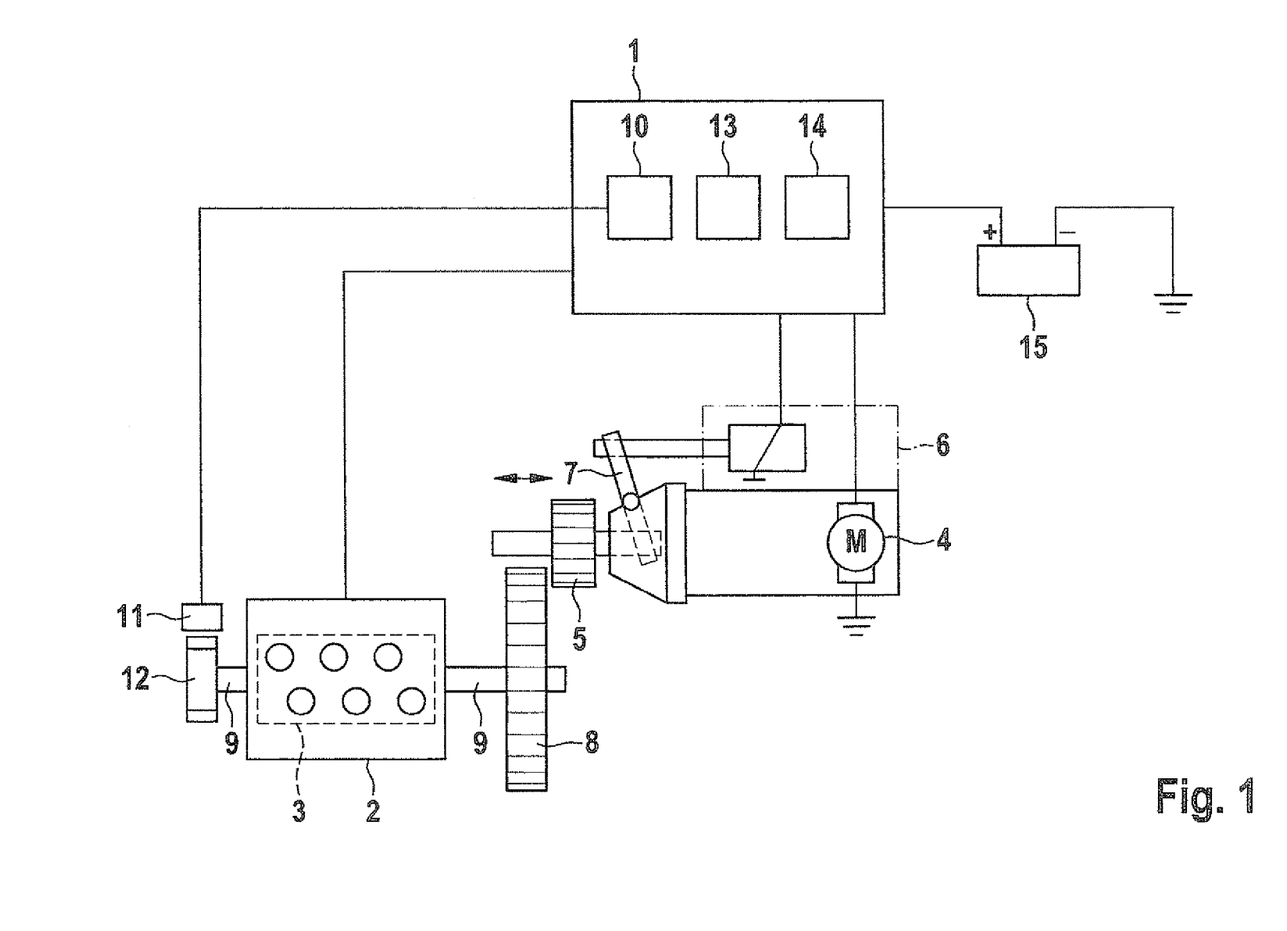
FIG. 1 shows a circuit diagram including a control unit for a start-stop system.

FIG. 1 shows a circuit diagram including a control unit 1 for a start-stop system of a motor vehicle and including an internal combustion engine 2 having six cylinders 3. The start-stop system turns off internal combustion engine 2 when the motor vehicle stops temporarily, e.g., at a red traffic light, by interrupting a fuel supply, and it restarts internal combustion engine 2 to continue driving. For this purpose, the start-stop system includes a starting device for internal combustion engine 2 having a starter motor 4, which is coupled to internal combustion engine 2 for starting in that a starter pinion 5 is meshed with a ring gear 8 of internal combustion engine 2 via a lever 7 with the aid of a starter relay 6, ring gear 8 being situated on a drive shaft 9 of internal combustion engine 2.

Control unit 1 also includes a measuring device 10 for measuring instantaneous rotational speeds $n_s$, $n_p$ of drive shaft 9 having a rotational speed sensor 11 which detects instantaneous rotational speeds $n_s$, $n_p$ with the aid of a gear wheel 12 situated on drive shaft 9 at different rotational positions φ of drive shaft 9, namely at a tooth position $φ_z$ of gear wheel 12 in each case. In an alternative control unit 1, instantaneous rotational speeds $n_s$, $n_p$ and rotational positions φ are transmitted and receivable by an external measuring device.

Moreover, control unit 1 includes a microcomputer 13 as an evaluation device and a memory 14 having a computer program product for executing the subsequently described method steps, in particular for determining a future rotational speed n, namely for a later point in time $t_0$, from a course $n_v$ of measured rotational speeds $n_s$, $n_p$.

Control unit 1 is supplied with electrical power by a battery 15. Starter motor 4 and starter relay 6 are activated by control unit 1 with the aid of driver circuits (not illustrated in greater detail) and are supplied with electrical power by battery 15.

Figure 2:
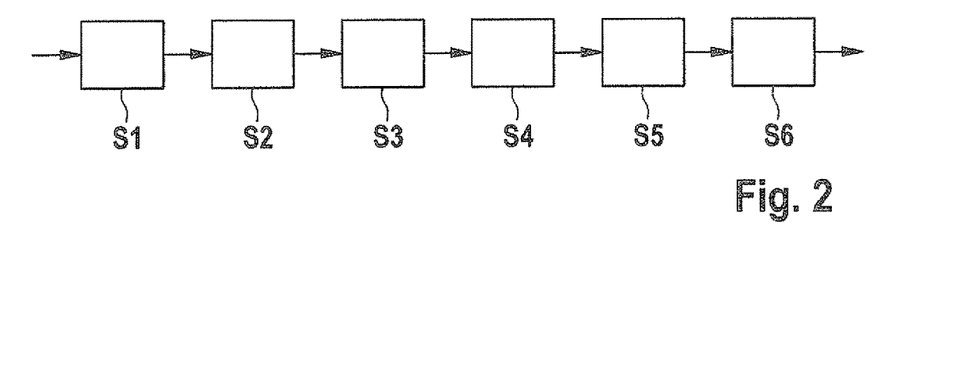
FIG. 2 shows a flow chart of a method for operating the control unit.

FIG. 2 shows a flow chart of a method for operating control unit 1 according to FIG. 1.

Figure 3:
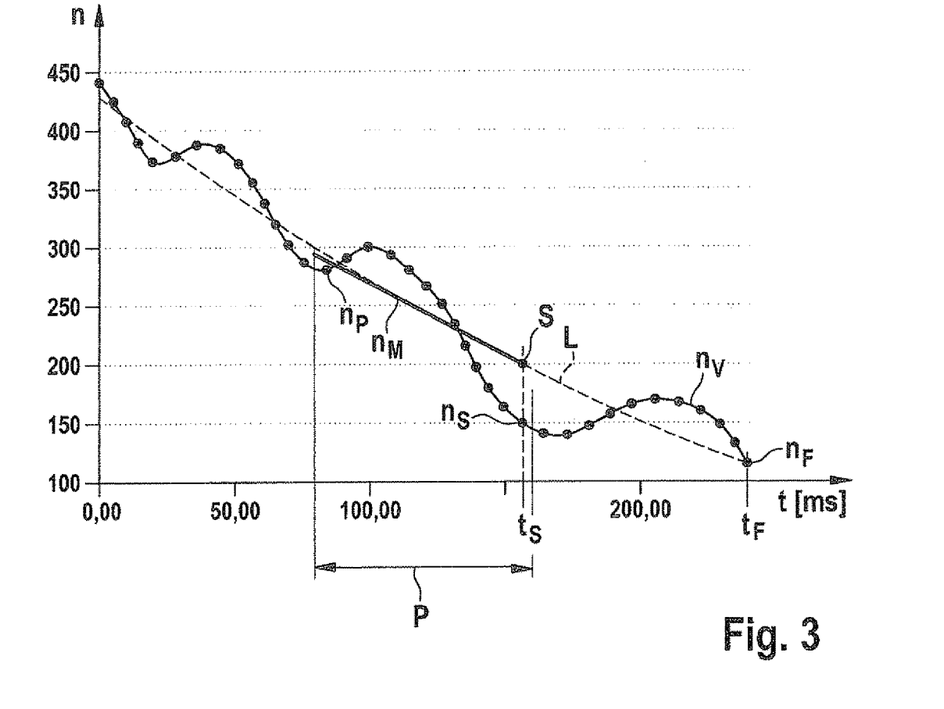
FIGS. 3 and 4 show a time-rotational speed diagram of a coasting internal combustion engine.
Figure 7:
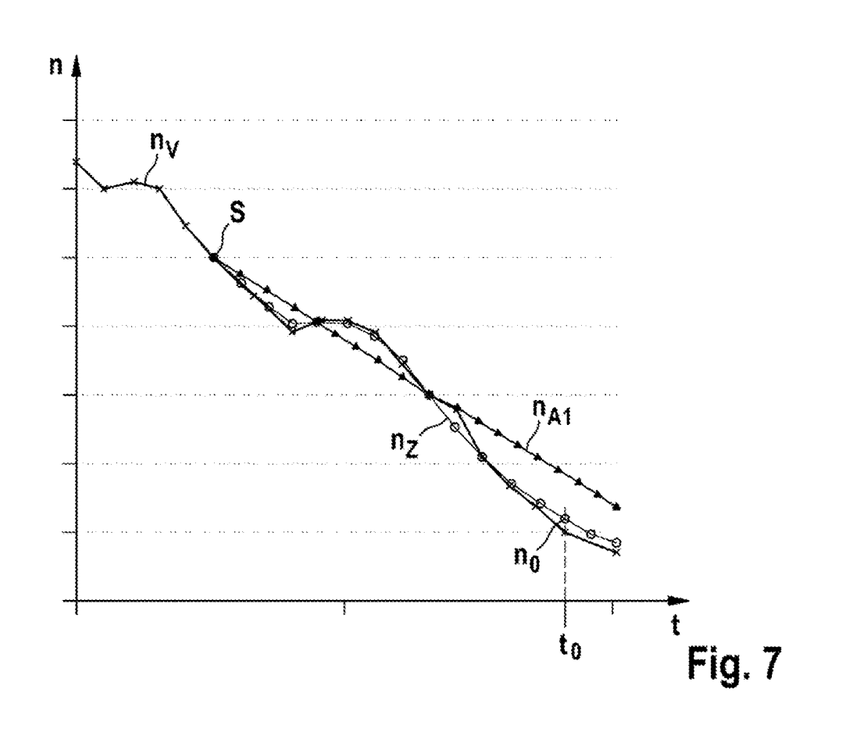
FIG. 7 shows a time-rotational speed diagram of a coasting internal combustion engine and the determination of a future rotational speed.

In a step S1, internal combustion engine 2 is turned off by control unit 1, by interrupting the fuel supply, due to a start-stop operation strategy when the motor vehicle stops. Subsequently, previously operated internal combustion engine 2 coasts after being turned off, namely at a coasting $n_A$ which represents an actual rotation of drive shaft 9 during coasting and which is shown in FIGS. 3, 4, and 7.

According to one specific start-stop operation strategy, starter pinion 5 is to be meshed with ring gear 8, which rotates on drive shaft 9, at a later point in time $t_0$, namely already during coasting $n_A$, i.e., before a standstill of internal combustion engine 2, in order to enable an immediate restart of internal combustion engine 2 for continued driving of the motor vehicle. For this purpose, starter pinion 5 must rotate essentially synchronously, i.e., at synchronous peripheral speeds, in relation to ring gear 8 at point in time $t_0$, in order to mesh with low wear. Accordingly, as explained in the following, a future rotational speed $n_0$ for future point in time $t_0$ is to be determined. In this way, it is eventually possible as a function of the prognosis of future rotational speed $n_0$ to appropriately activate starter motor 4, having starter pinion 5, as well as starter relay 6 to mesh in time before point in time $t_0$ in order to mesh at point in time $t_0$, which may be synchronously.

Figure 4:
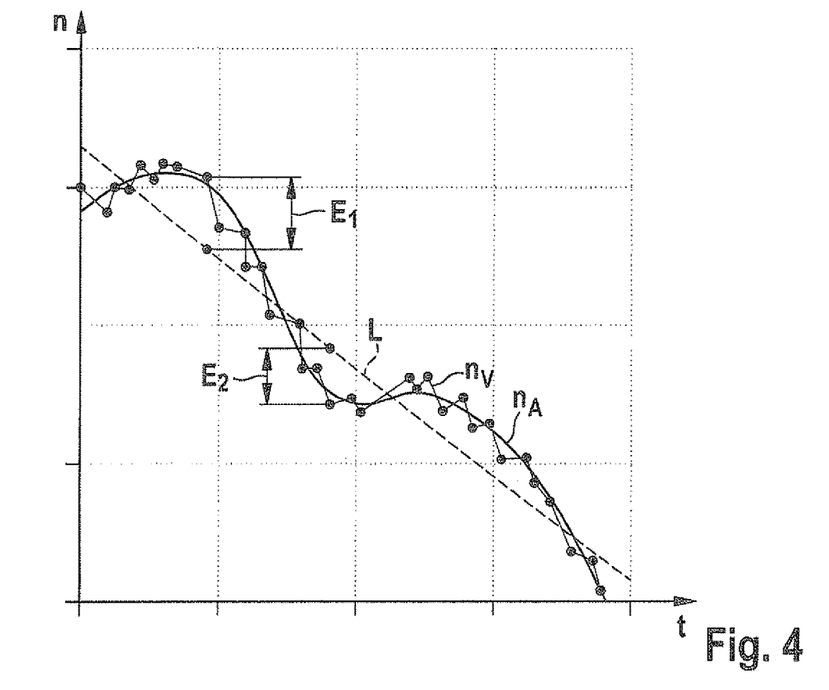

In a step S2, coasting $n_A$ is reproduced as course $n_v$, as shown in FIG. 4, in that using rotational speed sensor 11 instantaneous rotational speeds $n_s$, $n_p$ are measured and calculated by control unit 1 with the aid of measuring device 10 at different rotational positions φ of drive shaft 9. In this case, rotational speeds $n_s$, $n_p$ paired with the time information and the rotational position information are available as data. All available data for each coasting $n_A$ may be detected and processed in microcomputer 10.

Course $n_v$ is adjusted into the future to derive future rotational speed $n_0$ at later point in time $t_0$ from course $n_v$ of previously measured rotational speeds $n_s$, $n_p$. For this purpose, in a step S3, a regression line $n_M$ having a slope m of course $n_v$ is determined with the aid of a linear regression over selected rotational speeds $n_s$, $n_p$, as explained in FIG. 3.

Coasting $n_A$ is determined by the friction and the load torques of internal combustion engine 2 which cause over time t an increasingly flatter, i.e., more curved, shape of course $n_v$, as well as by compression and decompression cycles of cylinders 3 which result in an oscillation of course $n_v$. It is possible to accurately describe a center line L, namely the oscillation-adjusted shape of course $n_v$, at least sectionally due to the curvature, with the aid of regression line $n_M$ having slope m. However, the oscillation must additionally also be taken into consideration when adjusting course $n_v$, as explained in the following starting from a step S4.

In an alternative method, the oscillation is neglected, if it is only small, so that future rotational speed $n_0$ is determinable with less calculating effort. For this purpose, future rotational speed $n_0$ may be determined not only after a period duration P of the oscillation has elapsed, but it is rather particularly to determine future rotational speed $n_0$ already after two measured or all available rotational speeds $n_s$, $n_p$, every additionally measured rotational speed allowing a more accurate prognosis.

In step S4, the oscillation of course $n_v$ is determined based on maximum amplitudes $E_1$, $E_2$ which are illustrated in FIG. 4.

Figure 5:
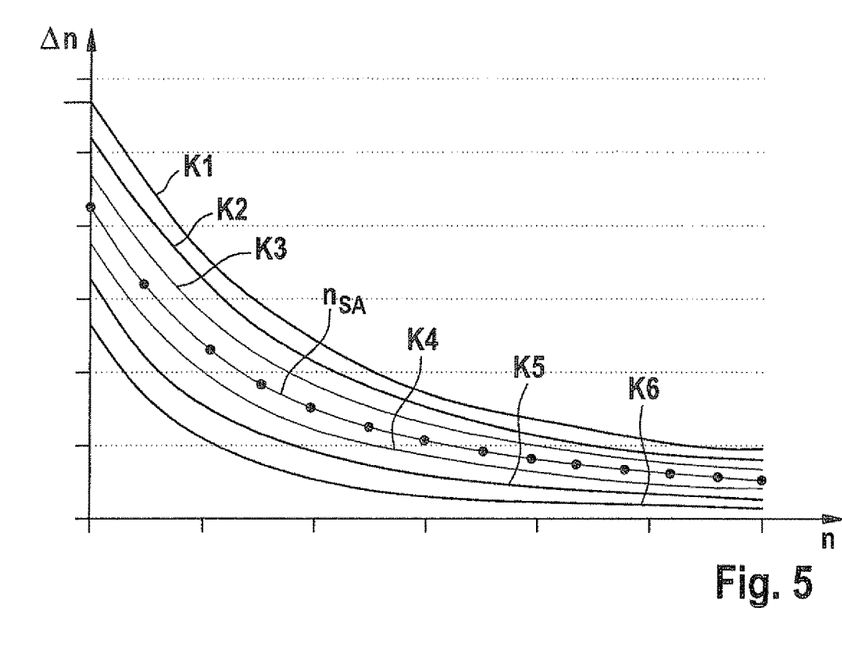
FIG. 5 shows a standard amplitude characteristics curve diagram.
Figure 6:
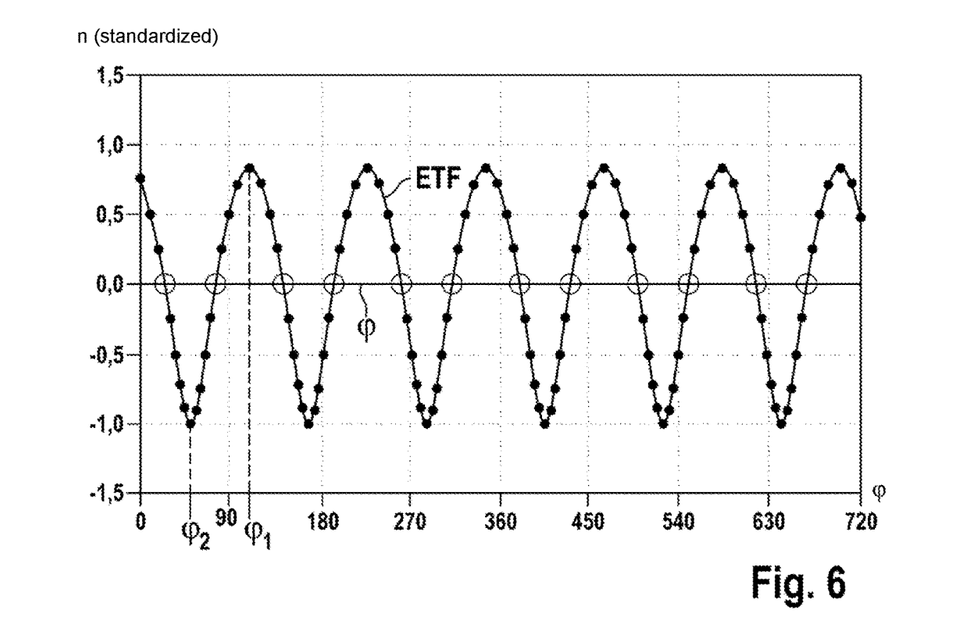
FIG. 6 shows a standardized oscillation characteristics curve.

In a step S5, an oscillating portion is derived from a standardized oscillation characteristics curve ETF illustrated in FIG. 6 and from a standard amplitude characteristics curve $n_{SA}$ shown in FIG. 5. Standardized oscillation characteristics curve ETF is scaled with the aid of standard amplitude characteristics curve $n_{SA}$ as a function of the rotational speed, namely using a simple calculation specification corresponding to a particular amplitude correction stage. In this way, instantaneous influences which have an effect on an amplitude of the oscillation, such as an intake manifold pressure, are considered during scaling.

The appropriate amplitude correction stage is determined by a comparison; the amplitude correction stage results from a smallest deviation between maximum amplitudes $E_1$, $E_2$ measured previously and from the values calculated with the aid of the corresponding simple calculation specifications from standard amplitude characteristics curve $G_{SA}$. An amplitude correction stage thus corresponds to an established calculation specification which, in particular, is configured as an approximate calculation using a multiplication and an additive term. An appropriate amplitude correction stage may be determined in each case over and over again depending on corresponding rotational speed n, thus improving the accuracy of the oscillating portion.

In a step S6, as shown in FIG. 7, course $n_v$ is adjusted into the future for the determination of future rotational speed $n_0$, namely using a linear portion $n_{A1}$ which is superimposed by the oscillating portion.

Steps S2 through S6 may be repeated in order to obtain a more accurate prognosis of future rotational speed $n_0$ at point in time $t_0$ in each case, namely by reducing the prognosis duration until point in time $t_0$ on the one hand, so that the accuracy of the prognosis is increased, and by providing a plurality of prognoses on the other hand, so that in one method for smoothing a triple-slip mean value of the most recently determined prognoses of future rotational speed $n_0$ is calculated, in order to further increase the accuracy of future rotational speed $n_0$. In an alternative method, a plurality of slopes m, as will be explained later, is accordingly determined to derive future rotational speed $n_0$ from slopes m with the aid of averaging, in particular with the aid of a triple-slip mean value. Alternatively, only the last complete period before a previously established mesh point in time is evaluated.

FIG. 3 shows a time-rotational speed diagram having course $n_v$ of measured rotational speeds $n_s$, $n_p$, rotational speed n being plotted against a time axis t in the illustration. For the sake of clarity, only the two rotational speeds $n_s$ and $n_p$ and a most recent rotational speed $n_F$, namely measured last by measuring device 10 at point in time $t_F$, are named as examples. Moreover, course $n_v$ has the oscillation which is essentially caused by a movement of cylinder 3, as previously described. Furthermore, center line L of course $n_v$ is illustrated as a dashed line.

Regression line $n_M$ was calculated via an averaging method, namely using a linear regression, via measured rotational speeds from $n_p$ through $n_s$. Slope m of regression line $n_M$ represents a slope of center line L in the illustrated section of course $n_v$, in particular during a period duration P, with high accuracy.

Mean regression line $n_M$ may be represented as a linear equation using formula n=m*t+c, namely including slope m, time t, and a constant c.

If individual measured rotational speeds $n_i$ are continuously numbered by variable i, the following results for a pth data set using the least squares method:

$$m_p = \frac{\left(\sum_{i=1}^{p} t_i * n_i\right) - p * \bar{t}_p * \bar{n}_p}{\left(\sum_{i=1}^{p} t_i^2\right) - p * (\bar{t}_p)^2}, \quad c_p = \bar{n}_p - m * \bar{t}_p$$

where:

$$\bar{t}_p = \frac{(p-1) * \bar{t}_{p-1} + t_p}{p}, \quad \bar{n}_p = \frac{(p-1) * \bar{n}_{p-1} + n_p}{p}$$

In this case, rotational speed n of regression line $n_M$ results at point in time $t_p$ of the pth data set from formula $n=m_p*t_p+c_p$.

Since rotational speeds $n_s$, $n_p$ do not scatter accidentally around center line L, but are to a certain degree in a functional, sinus-like relation with regard to the oscillation, only selected rotational speeds are considered for the linear regression, namely rotational speeds from $n_p$ through $n_s$ which span such a segment of course $n_v$ which essentially corresponds to exactly one period duration P of the oscillation. As shown in FIG. 3, the segment is, for example, selected in such a way that it starts at a minimum of the oscillation and extends until the next minimum. Here, measured rotational speed $n_p$ is the first, i.e., the oldest, measured rotational speed, and rotational speed $n_s$ is the latest, i.e., the most recent, measured rotational speed which is considered for the linear regression, a few rotational speeds being measured beyond $n_s$, in this example until $n_F$, to identify the period. This selection of rotational speeds $n_p$ through $n_s$ to be considered allows the slope to be accurately determined by a linear regression despite the oscillation and, in particular, a compensation of the sinus-like oscillation requiring a lot of calculating effort to be avoided.

In an alternative method, the linear regression is carried out from a maximum until the subsequent maximum. Moreover, not only in FIG. 3, the minima and the maxima of the oscillation are interchangeable as alternative methods with regard to the features described previously and in the following.

Furthermore, a base point S on regression line $n_M$ at a point in time $t_s$ of most recent considered rotational speed $n_s$ is determined, which, as explained in FIG. 7, is used as base point S to adjust course $n_v$ into the future. Here, most recent considered rotational speed $n_s$ is older than most recently measured rotational speed $n_F$ by less than one period duration P. Thus, an instantaneous piece of information regarding actual coasting $n_A$ of internal combustion engine 2 is available with the aid of regression line $n_M$ in order to determine future rotational speed $n_0$ as accurately as possible.

Thus, oldest rotational speed $n_p$, which is considered for the determination of future rotational speed $n_0$, is spaced apart chronologically from most recent rotational speed $n_s$, which is considered for the determination of future rotational speed $n_0$, by maximally one period duration P of the oscillation of course $n_v$. In this way, center line L may be described very accurately by regression line $n_M$ section by section, namely for the time interval of period duration P, namely in particular in the case of a curved course of center line L. Thus, older measured rotational speeds, which were detected before rotational speed $n_p$, are disregarded and are no longer detected by the linear regression. In this way, an instantaneous slope and also an instantaneous base point S are always available for an accurate determination of future rotational speed $n_0$.

In one method, interlacing of the linear regression calculation is used, multiple consecutive regressions, as previously described, being carried out which start alternatingly, for example, at consecutive minima and maxima of the oscillation. In this way, it is possible to determine a regression line $n_M$, i.e., slope m and base point S, in a greater chronological density, i.e., approximately every half period duration P.

In another method, it is averaged in each case via most recently determined slope m of regression line $n_M$ with the aid of a method of the slipping mean value, in particular using a triple-slip mean value, in order to determine future rotational speed $n_0$ more accurately by smoothing slopes m each calculated by regression.

In another method, for measured rotational speeds $n_s$, $n_p$ of course $n_v$, which are not equidistant over time, the individual measured values are weighted with regard to a suitable density function to increase the accuracy of the averaging for regression line $n_M$. The values may be balanced out section by section, one section in the positive range of the oscillation with regard to center line L being, for example, surrounded by sections in the negative range, in such a way that measured values having a lower density, i.e., greater time intervals, are provided with a higher weighting factor.

In one method, the oscillation's influence on the accuracy of the prognosis is reduced in that selected ranges of the course are determined based on an oscillation characteristics curve ETF, which is shown in FIG. 6, and only measured rotational speeds $n_s$, $n_p$ from these ranges are used for the regression calculation. In this way, the accuracy when determining regression line $n_M$ may be increased, for example, by neglecting rotational speeds $n_s$, $n_p$ which deviate more strongly from the center line.

In an alternative method, all available measured rotational speeds $n_s$, $n_p$ are, in the case of a small oscillation, included in the linear regression calculation. In this way, the accuracy may be increased due to a larger amount of data.

FIG. 4 shows a time-rotational speed diagram having an enlarged section of FIG. 3. FIG. 4 shows actual coasting $n_A$ as well as its detection by course $n_v$ of measured rotational speeds $n_s$, $n_p$. Moreover, FIG. 4 shows how extreme amplitudes $E_1$, $E_2$ of the oscillation of course $n_v$ around center line L are determined. Extreme amplitudes $E_1$, $E_2$ each have the greatest deviation of course $n_v$ from center line L, namely upward in the case of a maximum $E_1$ of the oscillation and also downward in the case of a minimum $E_2$ of the oscillation.

FIG. 5 shows a standard amplitude characteristics curve diagram having a standard amplitude characteristics curve $n_{SA}$ which represents a dependency of extreme amplitudes $E_1$, $E_2$ as a rotational speed correction $\Delta n$ from rotational speed n. Standard amplitude characteristics curve $n_{SA}$, i.e., its course, is specific to the engine type for particular internal combustion engine 2. It is stored in memory 14 as a reference table, so that it may be taken into consideration when determining future rotational speed $n_0$ with little calculating effort using microcomputer 13. In this way, a complex calculation may be avoided.

Furthermore, above and below standard amplitude characteristics curve $n_{SA}$, different curves $K_1$ through $K_6$ are shown for illustrating purposes, the curves being calculated from standard amplitude characteristics curve $n_{SA}$ using defined calculation specifications according to different amplitude correction stages. The appropriate amplitude correction stage is determined, as previously described, by a comparison, namely for a smallest deviation between measured actual extreme amplitudes $E_1$, $E_2$ shown in FIG. 4 and corresponding values of shown curves $K_1$ through $K_6$ for corresponding rotational speed n.

In one method, a learning algorithm analyzes—according to an established scheme, e.g., an established time period, mileage and/or number of start-stop cycles, in particular as a function of the surrounding and/or operating conditions, as well as according to any combinations of these criteria—the correction measures used in the past and derives therefrom a new calculation specification for a new amplitude correction stage. In another method, the learning algorithm also calculates a new adjusted standard amplitude characteristics curve $n_{SA}$ for further use.

FIG. 6 shows a standardized oscillation characteristics curve ETF, as an energy transformation characteristics curve which is characteristic for internal combustion engine 2 and which indicates a rotational speed amplitude, standardized to a value of one, as a function of a rotational position $\varphi$ of drive shaft 9. Oscillation characteristics curve ETF describes the shape of the oscillation of course $n_v$, namely only qualitatively since it is standardized to a value of one. For this purpose, it conformably indicates what portion of a maximum potential energy is currently converted into kinetic energy at drive shaft 9; this means that oscillation characteristics curve ETF characterizes the energy conversion from potential energy into kinetic energy and vice versa, which takes place cyclically. Minima $\varphi_2$ of oscillation characteristics curve ETF typically are at the ignition TDC positions of the engine. There, the energy stored in the compression is at its maximum and thus does not contribute to the kinetic energy. Maxima $\varphi_1$ of oscillation characteristics curve ETF, however, show rotational positions $\varphi$ at which the kinetic energy is at its maximum.

FIG. 7 shows the determination of future rotational speed $n_0$ at later point in time $t_0$, the determination being carried out by microcomputer 13. Course $n_v$ of measured rotational speeds $n_s$, $n_p$ is adjusted into the future, i.e., along time axis t beyond base point S as predicted future rotational speed course $n_z$, namely by superimposing a linear portion $n_{A1}$ and the oscillating portion. In order to show the accuracy when determining future rotational speed $n_0$, actual course $n_v$ of measured rotational speeds $n_s$, $n_p$ is also additionally illustrated beyond base point S. This means that actual coasting $n_A$ was measured beyond point in time $t_0$ as a test, even though these rotational speeds cannot be used to determine predicted future rotational speed $n_0$. It is thus possible to directly compare predicted future rotational speed course $n_z$ and actual course $n_v$.

Future rotational speed $n_0$ at point in time $t_0$ is determined in that linear portion $n_{A1}$, which has slope m of previously determined regression line $n_M$ and at which base point S is set, i.e., regression line $n_M$ is virtually adjusted into the future.

To determine future rotational speed $n_0$ more accurately, as mentioned previously, the oscillation of course $n_v$ is taken into consideration by the oscillating portion. For this purpose, oscillation characteristics curve ETF is scaled with the aid of standard amplitude characteristics curve $n_{SA}$, taking into consideration the established simple calculation specification corresponding to the particular amplitude correction stage. All figures show only schematic and not true-to-scale representations. Moreover, reference is made, in particular, to the drawings as essential to the exemplary embodiments and/or exemplary methods of the present invention.

What is claimed is:

1. A method of predicting a future rotational speed of a rotating drive shaft of an internal combustion engine, for use in engaging the internal combustion engine with a starting device, the method comprising:
   measuring, using a measuring device of a control unit, a course of rotational speeds of the drive shaft, the measured course having an oscillation;
   evaluating, using an evaluation device of the control unit, the rotational speeds at different rotational positions of the drive shaft over only a substantially single period of the oscillation to determine a linear portion, equal to a slope determined from the rotational speeds, and an oscillating portion, determined using an oscillating characteristics curve and a selected amplitude characteristics curve, the selected amplitude characteristics curve being a function of rotational speed and selected from a plurality of different amplitude characteristics curves based on comparing a maximum amplitude of the oscillation to the plurality of different amplitude characteristics curves;
   predicting, using the evaluation device of the control unit, the future rotational speed as a function of the linear portion and the oscillating portion; and
   engaging the internal combustion engine with the starting device as a function of the predicted future rotational speed.

2. The method of claim 1, wherein the slope is determined as a regression line from the measured rotational speeds over the single period of the oscillation using an averaging method, and the future rotational speed is derived from the linear portion having the slope, having a base point for the linear portion which is a point of the regression line corresponding to a point in time of a most recently measured rotational speed which is considered when determining the future rotational speed.

3. The method of claim 1, wherein the slope is derived from the rotational speeds which were measured within a certain phase range of the oscillation, within a phase range having a positive or a negative amplitude of the oscillation, or within a phase range having a positive and, adjoining on each side, a negative amplitude, or having a negative and, adjoining on each side, a positive amplitude.

4. The method of claim 1, wherein the slope is evaluated from the measured rotational speeds between two extreme amplitudes distributed over the single period of the oscillation.

5. The method of claim 1, further comprising disregarding older rotational speeds when evaluating the rotational speeds, so that the oldest considered rotational speed is older by only the single period than a most recent considered rotational speed, and the most recent considered rotational speed is more recent than a one period duration of the oscillation of the course.

6. The method of claim 1, wherein an oscillation characteristic derived from the oscillation characteristics curve is scaled using the selected amplitude characteristics curve.

7. The method of claim 1, wherein a normalized rotational speed amplitude of the oscillating portion is determined using the oscillating characteristics curve, which is stored as a first reference table providing the normalized rotational speed amplitude as a function of the rotational position of the drive shaft.

8. The method of claim 7, wherein a scaled amplitude of the oscillating portion is determined using the selected amplitude characteristics curve, which is stored as a second reference table providing a rotational speed amplitude scaling as a function of the measured course of rotational speeds.

9. The method of claim 1, wherein the linear slope is determined as a regression line from the measured rotational speeds over the single period of the oscillation.

10. The method of claim 1, wherein the evaluating includes weighting the rotational speeds according to a density function, wherein measured rotational speeds having a low density over time are given a higher weighting than measured rotational speeds having a high density over time.

11. The method of claim 1, wherein the substantially single period extends from a rotational position of the drive shaft at which the measured course of rotational speeds has a first minimum to a rotational position of the drive shaft at which the measured course of rotational speeds has a second minimum.

12. The method of claim 1, wherein the substantially single period extends from a rotational position of the drive shaft at which the measured course of rotational speeds has a first maximum to a rotational position of the drive shaft at which the measured course of rotational speeds has a second maximum.

13. The method of claim 1, wherein the comparing determines differences between the maximum amplitude of the oscillation and the plurality of different amplitude characteristics curves, and the selected amplitude characteristics curve is selected based on the determined differences.

14. The method of claim 13, wherein the selected amplitude characteristics curve has the lowest difference from the maximum amplitude of the oscillation among the plurality of the different amplitude characteristics curves.

15. The method of claim 1, wherein the selected amplitude characteristics curve accounts for engine performance parameters.

16. The method of claim 1, wherein the oscillating characteristics curve and the selected amplitude characteristics curve are represented by reference tables stored in a memory.

17. A control unit for a start-stop system of a motor vehicle, comprising:
 a measuring device to measure a course of rotational speeds of a drive shaft of an internal combustion engine, the measured course having an oscillation;
 an evaluation device to:
 evaluate the rotational speeds at different rotational positions of the drive shaft over only a substantially single period of the oscillation to determine a linear portion, equal to a slope determined from the rotational speeds, and an oscillating portion, determined using an oscillating characteristics curve and a selected amplitude characteristics curve, the selected amplitude characteristics curve being a function of rotational speed and selected from a plurality of different amplitude characteristics curves based on comparing a maximum amplitude of the oscillation to the plurality of different amplitude characteristics curves;
 predict the future rotational speed as a function of the linear portion and the oscillating portion; and
 engage the internal combustion engine with a starting device as a function of the predicted future rotational speed.

18. The control unit of claim 17, wherein:
 a normalized rotational speed amplitude of the oscillating portion is determined using the oscillating characteristics curve, which is stored as a first reference table providing the normalized rotational speed amplitude as a function of the rotational position of the drive shaft, and
 a scaled amplitude of the oscillating portion is determined using the amplitude characteristics curve, which is stored as a second reference table providing a rotational speed amplitude scaling as a function of the measured course of rotational speeds.

19. A non-transitory machine-readable storage medium having program instructions, which when executed by a processor perform a method, the method comprising;
 measuring, using a measuring device of a control unit, a course of rotational speeds of a drive shaft of an internal combustion engine, the measured course having an oscillation;
 evaluating, using an evaluation device of the control unit, the rotational speeds at different rotational positions of the drive shaft over only a substantially single period of the oscillation to determine a linear portion, equal to a slope determined from the rotational speeds, and an oscillating portion, determined using an oscillating characteristics curve and a selected amplitude characteristics curve, the selected amplitude characteristics curve being a function of rotational speed and selected from a plurality of different amplitude characteristics curves based on comparing a maximum amplitude of the oscillation to the plurality of different amplitude characteristics curves;
 predicting, using the evaluation device of the control unit, the future rotational speed as a function of the linear portion and the oscillating portion; and
 engaging the internal combustion engine with a starting device as a function of the predicted future rotational speed.

20. The non-transitory storage medium of claim 19, wherein:
 a normalized rotational speed amplitude of the oscillating portion is determined using the oscillating characteristics curve, which is stored as a first reference table providing the normalized rotational speed amplitude as a function of the rotational position of the drive shaft, and
 a scaled amplitude of the oscillating portion is determined using the amplitude characteristics curve, which is stored as a second reference table providing a rotational speed amplitude scaling as a function of the measured course of rotational speeds.

21. A method for determining a future rotational speed of a rotating drive shaft of an internal combustion engine, while the internal combustion engine coasts after being turned off, the method comprising:
 measuring, using a rotational speed sensor, a course of rotational speeds of the drive shaft, the measured course having an oscillation;

evaluating, using an evaluation device of a control unit, the rotational speeds at different rotational positions of the drive shaft over only a phase range of the oscillation, the phase range having substantially equal portions above and below a center line of the measured course, to determine a linear portion, equal to a slope determined from the rotational speeds, and an oscillating portion, determined using an oscillating characteristics curve and a selected amplitude characteristics curve, the selected amplitude characteristics curve being a function of rotational speed and selected from a plurality of different amplitude characteristics curves based on comparing a maximum amplitude of the oscillation to the plurality of different amplitude characteristics curves;

predicting, using the evaluation device of the control unit, the future rotational speed as a function of the linear portion and the oscillating portion; and engaging the internal combustion engine with a starting device as a function of the predicted future rotational speed.

22. The method of claim 21, wherein:

a normalized rotational speed amplitude of the oscillating portion is determined using the oscillating characteristics curve, which is stored as a first reference table providing the normalized rotational speed amplitude as a function of the rotational position of the drive shaft, and a scaled amplitude of the oscillating portion is determined using the selected amplitude characteristics curve, which is stored as a second reference table providing a rotational speed amplitude scaling as a function of the measured course of rotational speeds.

23. The method of claim 21, wherein the oscillating characteristics curve and the selected amplitude characteristics curve are represented by reference tables stored in a memory.

* * * * *